Nov. 3, 1964     S. BALAN     3,155,361

VIBRATION ISOLATION MOUNT

Filed June 8, 1961     2 Sheets-Sheet 1

INVENTOR.
SAMUEL BALAN
BY
ATTORNEY

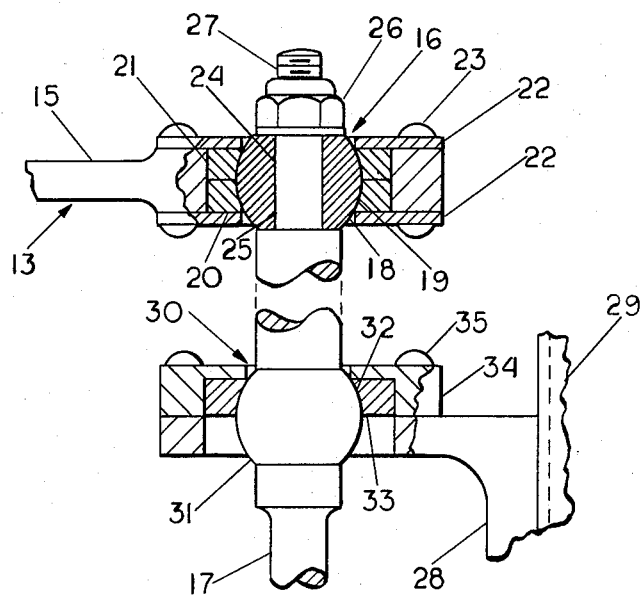
FIG. 2
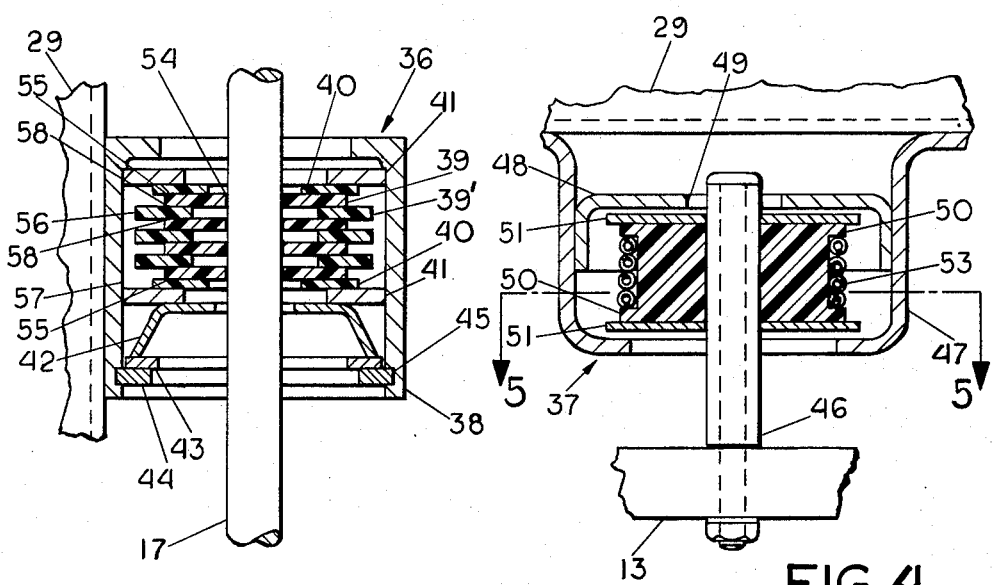
FIG. 3   FIG. 4
*INVENTOR.*
SAMUEL BALAN
ATTORNEY

United States Patent Office 3,155,361
Patented Nov. 3, 1964

3,155,361
VIBRATION ISOLATION MOUNT
Samuel Balan, Brooklyn, N.Y., assignor to Grumman Aircraft Engineering Corporation, Bethpage, N.Y., a corporation of New York
Filed June 8, 1961, Ser. No. 115,819
10 Claims. (Cl. 248—358)

This invention relates to shock and vibration isolation mounting means and more particularly to a mounting for objects such as precision instruments and equipment in highly-mobile vehicles such as aircraft, missiles, and ships.

In the shock and vibration isolation mounting system of the present invention, the object to be protected is supported in such a manner with relation to another object or to the vehicle in which it is carried as to permit limited translatory movement in any direction relative to said second object, but which is resistant to angular motion relative to said second object about one or more axes about which said angular motion may occur.

The mounting means of the present invention finds particular utility in the mounting of objects which are desired to be isolated from impressed shock or vibration, and which must be maintained within close limits in a prescribed angular relationship to a second object or to the vehicle in which the object is carried.

In particular, the satisfactory isolation of gyroscopic instruments cannot be accomplished by conventional non-gyroscopic instrument mounting techniques. A mounting system for non-gyroscopic equipment need merely limit the absolute magnitude of the overall vibratory response of the equipment to tolerable levels, as the rotational components of the response of the equipment so mounted with respect to the vehicle are of no significance since they do not affect adversely the basic functioning of the equipment. However, rotational motions of a gyroscopic instrument with respect to the vehicle in which it is carried are highly undesirable because they can seriously degrade fundamental gyroscopic functions. As examples of particular embodiments of the present invention, in addition to gyroscopes, there may be cited the mounting of objects such as gun directors, radar antenna, and similar devices in vehicles such as high-performance aircraft, missiles, ships, land vehicles, and the like. In the case of such embodiments, it will be apparent that it is desirable to isolate the object from shocks and vibrations such as engine, acoustic, surface, and aerodynamic disturbances. In order to accomplish this purpose effectively, it is necessary to provide for controlled and limited relative movement in all directions between the object and a second object or the vehicle. Various systems have been devised to meet these requirements while maintaining the precise angular relationship desired, but so far as the applicant is aware, all such systems have suffered from mechanical complexity, excessive weight, and undue space requirements.

It is thus an important object of this invention to provide a mounting means for objects carried in a vehicle which effectively isolates and protects the object from impressed forces such as shock and vibration.

It is a further object of this invention to provide a shock and vibration isolation mounting means for objects carried in a vehicle which maintains a prescribed angular relationship within close limits between the object and the vehicle in which it is carried.

Another object of the present invention is to provide an improved suspension for fragile, sensitive instruments and other objects which will effectively insulate those objects from shock and vibrations occurring in all directions.

An object of this invention is the provision of a compact lightweight shock and vibration isolation mounting means that will allow translation in one or more of three mutually-perpendicular planes while limiting rotation about one or more of the three related axes.

A further object is to provide a mounting system of the type stated in which both translational flexibility in all three planes and rotational restraint about one or more of the three related axes are provided without the use of auxiliary mechanical restraint devices.

Still another object is to provide a shock and vibration isolation mounting of the above nature in which all structural elements may be constructed of metal so there will be minimal degradation of performance resulting from high or low temperatures or other environmental extremes.

Another object of the present invention is to provide a mounting of the type stated that features mechanical simplicity, low weight, and a minimum in space requirements.

Other objects and advantages will become apparent from the following description when taken in conjunction with the accompanying drawings in which:

FIG. 2 is an elevational view partly sectioned taken along line 2—2 of FIG. 1 showing the universal connections used in this embodiment.

FIG. 3 is a longitudinal sectional view of one of the vibration dampers of FIG. 1;

FIG. 4 is a longitudinal sectional view of another of the vibration dampers.

Figure 1:
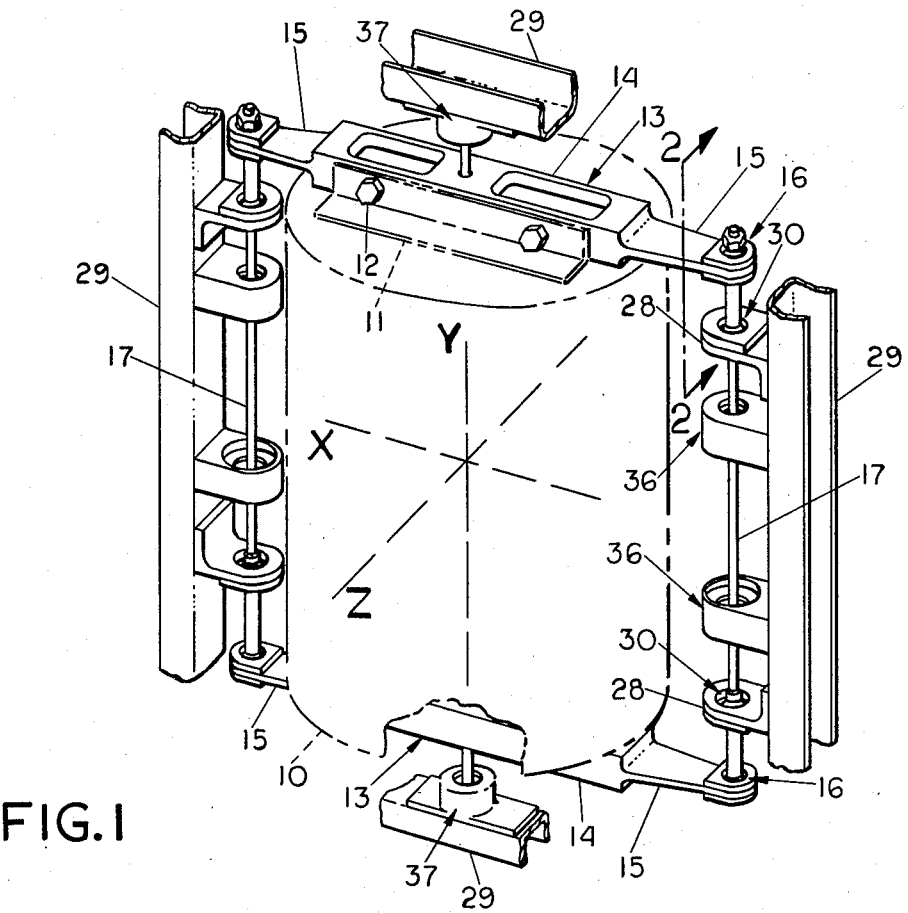
FIG. 1 is a schematic view of a shock and vibration isolation mount embodying the present invention.

As shown in FIG. 1, numeral 10 indicates an object attached by means of a bracket 11 and bolts 12 or other suitable fastening means to transverse beams 13. The object 10 may be an instrument such as a gyroscope or accelerometer, or any other instrument or article which it is desired to isolate from impressed shock and vibration. The transverse beams 13 are constructed with a thickened, non-resilient center section 14 and substantially thinner, resilient sections 15 in the end portions of the beams. The beam center section 14 is ribbed or otherwise suitably strengthened for rigidity, and is provided with holes for bolts 12 or other fasteners with which the object 10 is rigidly secured to the beam. The resilient sections 15 of the transverse beams are essentially leaf springs which are cantilevered outwardly beyond the object and are connected at their ends by a suitable universal coupling 16 to resilient longitudinal rods 17.

Universal couplings 16 may be any suitable low-friction universal connections which transmit loads but not torques. A preferred embodiment, best shown in FIG. 2, comprises a low-friction ball and socket bushing in which a ball 18 operates in a ball socket 19 formed in collar 20. This collar is secured in a bore 21 in the end of the resilient section 15 of the beam 13 by two retainers 22. Retainers 22 are secured by rivets 23 or other suitable fasteners to resilient section 15. The ball 18 is provided with an axial bore 24 which fits on a reduced diameter 25 on the ends of the resilient rod 17. A nut 26, which is screwed on the threaded end 27 of resilient rod 17 retains ball 18 on the rod.

Resilient rods 17 are attached by means of ball joints 30 to brackets 28 which are bolted or otherwise suitably fixed to a frame 29 comprising fixed structure. The frame 29, which may be fabricated of light-weight channel members or other suitable structural sections, is not germane to a functional description of the present invention and will not further be described. Although ball joint 30 is a preferred embodiment, it is within the scope of this invention to employ any suitable universal connection which transmits loads but not torques to attach the resilient rods 17 to the brackets 28. Ball joint 30 comprises a ball 31 machined or otherwise suitably formed on or affixed to rod 17 and which is engaged in a ball socket 32 of collar 33. This collar is retained by a flanged retainer 34 which is fixed by rivets 35 or other suitable fastening means to bracket 28. This universal connection permits freedom of movement or deflection of the ends of the rods 17 in and between two planes of right angles to each other. Inasmuch as the ball joints 30 spaced along the resilient rod 17 act as a cooperating pair, the rod is secured against axial travel outwardly with respect to ball joints 30.

In this embodiment of the present invention, resonant vibrations are damped by friction-type dampers 36 and 37. Resonant vibrations in directions normal to the resilient rods 17 are damped by dampers 36. A pair of dampers 36 are used for each resilient rod 17, although it will be obvious that the employment of dampers, or the number or type used does not constitute a limitation but only represents a preferred embodiment for the purposes of this description. As best illustrated in FIG. 3, each damper 36 is rigidly fixed by suitable means on frame 29 and comprises a cylindrical, cup-like damper housing 38 through the center of which resilient rod 17 passes. Enclosed in housing 38 and fitted on the rod are alternately stacked a series of friction washers 39 and 39' which are fabricated from a plastic or other suitable material. Washers 39 are loosely fitted on rod 17 and their outer edges are spaced a substantial distance from the inner wall 57 of the housing 38. Washers 39' have a substantially large clearance between their inside diameters and rod 17, but their outer edges 56 are spaced substantially closer to the inner wall 57 of housing 38 than the outer edges of washers 39. Located at each end of the stack of friction washers 39 and 39' are washers 40 and retaining washers 41. Washers 40 are made of a plastic or other material having suitable frictional characteristics. The entire stack of washers is under spring pressure which may be furnished by a dished-disk spring 42 or any other suitable spring. Spring 42 rides on washer 43 which is located by an annular retainer 44 which is snapped into place in groove 45.

In the operation of dampers 36, the frictional characteristics of washers 40 and retaining washers 41 are such to limit relative movement between them and, for the purposes of this description, those washers are considered to be fixed relative to one another. In operation, the initial displacement of rod 17 will be unimpeded by the dampers 36, and hence undamped until the rod has moved sufficiently to absorb the clearance between it and the inside diameter 54 of washers 39. Further displacement of rod 17 will then be accompanied by an identical movement of washers 39. This movement of the rod and washers will be resisted by a damping force which is a factor of the frictional resistance at the area of contact 55 between the friction washers 39 and washers 40. Friction washers 39' which are interposed between washers 39, initially are carried along with washers 39 and do not contribute to the damping force. Continued displacment of rod 17 will bring edge 56 of washers 39' into contact with the inside wall 57 of housing 38. The washers 39' thereby being retained from further movement, any further displacement of rod 17 will cause washers 39 to move relative to washers 39'. The damping force of the structure will thus be increased by the frictional resistance of the areas of contact 58 between friction washers 39 and friction washers 39'. This sequence of operation will be duplicated in the reciprocal excursion of the rod 17.

In effect, two-stage damping will be provided by damper 36, with small motions of rod 17 being resisted by small damping forces and resonance producing large damping forces. In the embodiment shown, small motions are resisted by friction at two areas of contact and large motions are resisted by friction at eight areas of contact, the damping force of the second stage thus being four times that of the first stage. It will be obvious that, by varying the number and sizes of the friction washers used, a damper with as many stages as required can be produced. Use of a sufficient number of stages will result in a damper whose damping force will vary substantially linearly with displacement. It is also obvious that the arrangement of the friction washers are a function of the amount of damping required and may vary from that shown.

Figure 5:
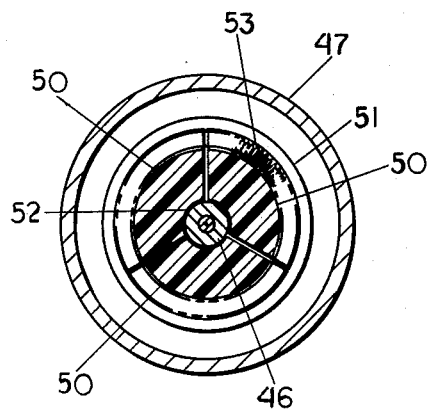
FIG. 5 is a sectional view of FIG. 4 taken along the line 5—5.

Damping of resonant vibrations in a direction parallel to the longitudinal axis of rods 17 is accomplished by dampers 37 which operate at both ends between transverse beams 13 and the frame 29. As stated previously, the number and type of dampers shown does not constitute a limitation but only represent a preferred embodiment for the purposes of this description. Damper 37 comprises a tubular rod 46 which is bolted or otherwise fastened to transverse beam 13. Rod 46 is located perpendicular to the face of the beam and extends through the center of damper housing 47, as best shown in FIG. 4. Housing 47 is an open-ended, cup-shaped part which is riveted or otherwise suitably fastened to the frame 29. A truncated, cup-shaped sheet metal element 48 is welded or otherwise fastened inside housing 47 in a spaced relationship with its face so that a chamber is formed in the housing. An axial hole 49 is provided in element 48 to accommodate tubular rod 46. Contained in the chamber of the damper housing 47 and in contact with the tubular rod 46 are friction segments 50 which are sandwiched between washer-like disks 51. Referring now to FIG. 5, segments 50 are wedge-shaped parts made from any material having suitable friction characteristics with an included angle of 120 degrees between the faces of the wedge. The outer face of each wedge has an arcuate configuration such, when the wedges are assembled around the tubular rod 46, the assembly is cylindrical in shape. A circular cut-out 52 in which the tubular rod 46 operates is provided at the apex of each wedge. Encircling the periphery of the assembled wedge to provide the proper frictional contact between the segments 50 and the tubular rod 46 are coil springs 53. The damping performance of the damper 37 can be varied to suit requirements by varying the characteristics of the springs 53 or by selecting a material having the desired frictional properties for segments 50.

In operation, the frame 29 will be fixed rigidly to frame members or other structural elements of a vehicle such as an aircraft, missile, or ship. The object 10 will thus be resiliently suspended inside the structure formed by the resilient rods 17 and the transverse beams 13 and will be free of any other attachment with the vehicle. As will be readily apparent, if reference is made to FIG. 1, any shock or vibration transmitted to the frame 29 will be absorbed or dampened by the resilient rods 17 or the resilient sections 15 of the transverse beams 13 or by a concerted action of those resilient elements. Should any translational force perpendicular to the axis of the rods 17 be transmitted to the frame 29, i.e., a force in the X—Z plane of FIG. 1, this force will be resisted by the resilient rods 17, tending to cause the ends of the rods to move in the direction of the force. Because, in effect, the universal couplings 30 will act as fulcrums, the section of each rod 17 lying between the couplings 30 will arch in a direction that will be opposite to that of the force. Under these conditions, the forces will be resisted solely by the resilient rods 17 with the resilient sections of the transverse beams 13 remaining undeflected and acting substantially as rigid, load-transmitting members.

Under conditions of translational forces parallel to the axis of the resilient rods 17, i.e., forces in the direction of the Y axis of FIG. 1, the loads will be absorbed or dampened by the deflection of the resilient sections 15 of the beams 13.

Forces which act to rotate the object 10 about the X and Z axes relative to its mounting will be resisted by a concerted reaction of the resilient rods 17 and the beam resilient sections 15. Because rotational movements of the object about these axes results in a deflection of one end of the rods in an opposite direction to the other end, the rods are subjected to a double bending effect to which they are highly resistant. The rotational stiffness of this system about the X and Z axes thus is inherently very high, and relative rotational movements of the object are severely restricted. Forces which act to rotate the object 10 about the Y axis will be resisted by resilient rods 17, with the transverse beam resilient sections 15, in effect, remaining undeflected and acting substantially as rigid, load-transmitting members. Under conditions of rotation about the Y axis, the ends of each resilient rod 17 are deflected in the same direction, thus the stiffening effect of double bending rods is not developed. Where required, this may be compensated for by providing the maximum possible spacing between the resilient rods, or by orienting the system such that the axis of least stiffness (i.e., the Y axis) coincides with the axis of the object 10 which has the smallest radius of gyration, or by orienting the Y axis with the axis of the vehicle about which the least rotational excitation exists. This system thus effectively isolates translational components of impressed shock and vibration, and also maintains a maximum degree of parallelism between the object and the vehicle in which it is carried by severely restricting rotational movements.

Although the elements of the present invention may be proportioned such that the object 10 is effectively isolated from the shocks and vibrations to which it normally will be subjected, it usually will be advisable to make provision for snubbing means to cope with any abnormal shocks which may occur. Such snubbing means do not form a part of this present invention and thus are not described or illustrated, but may consist of any of a number of conventional snubbers chosen with a view of the operational requirements that will prevail.

Obviously many modifications and variations of the present invention are possible in the light of the above teaching. Although a mounting system using a pair of longitudinal resilient rods has been specifically described herein, it is apparent that mounting systems employing arrangements using as few as one or any suitable number of resilient rods more than the two as shown are encompassed in this invention.

Another modification or variation that does not depart from the spirit and scope of the present invention is to fix the brackets 28 to the object 10 instead of the frame 29, and to use resilient means similar to beam resilient sections 15 as an attachment between the ends of the resilient rods and the frame. In such an arrangement, of course, transverse beams 13 are not required. In other words the object 10, depending upon its configuration, could be mounted and carried upon the frame members 29 and the brackets 11 attached to fixed structure.

In many applications of the present invention, it may be advantageous to employ rubber universal connections instead of the ball and socket universal connections 16 and 30. Such rubber universal connections, which use a rubber or other suitable elastomer interposed between two relatively movable elements, are well known in the art and their low cost, simplicity, and inherent damping characteristics may be used with advantage where environmental conditions permit. However, it will be obvious that the use of such rubber universal connections are within the meaning and intent of the present invention.

Although shown and described in what is believed to be the most practical and preferred embodiment, it is apparent that departures from the specific apparatus shown will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. A vibration isolation mounting comprising a pair of spaced parallel resilient rods, universal connection mounting means spaced at two points along said rods intermediate their end portions, a pair of beams, at least the end portions of which are resilient, universal coupling means connecting the end portions of said beams with the ends of said rods, and mounting means provided in the central portion of said beams.

2. A vibration isolation mounting for an object comprising a pair of spaced parallel resilient rods, universal connections spaced at two points along said rods and intermediate the end portions thereof for mounting said rods to fixed structure, a pair of beams, at least the end portions of which are resilient, universal coupling means connecting the end portions of said beams with the ends of said rods, and means for attaching the object to the central portion of said beams.

3. A vibration isolation mounting as set forth in claim 2 and including damper means connecting said rods to fixed structure.

4. A vibration isolation mounting as set forth in claim 2 and including damper means connecting the central portion of said beams to fixed structure.

5. A vibration isolation mounting as set forth in claim 2 and including damper means connecting said rods to fixed structure and damper means connecting the central portion of said beams to fixed structure.

6. A vibration isolation mounting for an object comprising a pair of spaced parallel resilient rods, universal connection mounting means spaced at two points along said rods and intermediate the end portions thereof to permit deflection of said rods in and between two planes at right angles to each other, a pair of beams having end portions which are resilient to permit deflection in a plane at right angles to those planes in which said rods deflect, universal coupling means connecting the end portions of said beams with the ends of said rods, and mounting means provided on the center portion of said beams.

7. A vibration isolation mounting for an object comprising a pair of spaced parallel resilient rods, universal connections spaced at two points along said rods and intermediate the end portions thereof for mounting said rods to fixed structure, said universal connections permitting deflection of said rods in and between two planes at right angles to each other, a pair of beams each having rigid center portions and resilient end portions permitting deflection in a plane at right angles to those planes in which said rods deflect, universal coupling means connecting the end portions of said beams with the ends of said rods and means for attaching the object to the center portion of said beams.

8. A vibration isolation mounting as set forth in claim 7 and including damper means connecting said rods to fixed structure comprising a cylindrical cup-like housing having an inner surface and carried by said fixed structure and through the center of which said rod passes, at least two friction washers positioned along said rod and having a relatively small clearance between their inside diameters and said rod and a substantial clearance between their outer edges and the inner surface of said housing, at least one additional friction washer positioned between said first mentioned friction washers and having a clearance between its inside diameter and said rod greater than that of said first mentioned friction washers and having a clearance between its outer edge and the inner surface of said housing less than that of said first mentioned friction washers, and spring means biasing said washers into contact.

9. A vibration isolation mounting comprising at least one resilient rod, a pair of universal connection mounting means spaced from each other longitudinally along said rod intermediate its end portions, a pair of beams, at least the end portions of which are resilient, universal coupling means connecting the end portions of said beams with the ends of said rod, and mounting means provided in the central portion of said beams.

10. A vibration isolation mounting comprising a plurality of spaced parallel resilient rods, a pair of universal connection mounting means spaced from each other longitudinally along said rods intermediate their end portions, a pair of beams, at least the end portions of which are resilient, universal coupling means connecting the end portions of said beams with the ends of said rods, and mounting means provided in the central portion of said beams.

References Cited in the file of this patent

UNITED STATES PATENTS

| | | |
|---|---|---|
| 1,980,136 | Howe | Nov. 6, 1934 |
| 2,683,016 | Campbell | July 6, 1954 |
| 2,711,297 | Thiele | June 21, 1955 |
| 2,900,162 | Crede | Aug. 18, 1959 |
| 2,924,420 | Fink | Feb. 9, 1960 |